US012626969B2

(12) United States Patent
Huo

(10) Patent No.: US 12,626,969 B2
(45) Date of Patent: May 12, 2026

(54) BATTERY PACK AND ENERGY STORAGE DEVICE

(71) Applicant: Hithium Tech HK Limited, HongKong (CN)

(72) Inventor: Qiqi Huo, Xiamen (CN)

(73) Assignee: Hithium Tech HK Limited, Hongkong (CN)

( * ) Notice: Subject to any disclaimer, the term of this patent is extended or adjusted under 35 U.S.C. 154(b) by 830 days.

(21) Appl. No.: 17/973,464

(22) Filed: Oct. 25, 2022

(65) Prior Publication Data

US 2023/0216103 A1    Jul. 6, 2023

(30) Foreign Application Priority Data

Jan. 6, 2022    (CN) ........................ 202220024019.X

(51) Int. Cl.
| | |
|---|---|
| *H01M 10/6555* | (2014.01) |
| *H01M 10/613* | (2014.01) |
| *H01M 50/213* | (2021.01) |
| *H01M 50/262* | (2021.01) |
| *H01M 50/289* | (2021.01) |

(52) U.S. Cl.
CPC ..... *H01M 10/6555* (2015.04); *H01M 10/613* (2015.04); *H01M 50/213* (2021.01); *H01M 50/262* (2021.01); *H01M 50/289* (2021.01)

(58) Field of Classification Search
CPC ........... H01M 10/6555; H01M 50/262; H01M 10/613; H01M 50/289; H01M 50/213
See application file for complete search history.

(56) References Cited

U.S. PATENT DOCUMENTS

| | | | |
|---|---|---|---|
| 2022/0336910 A1* | 10/2022 | Dobusch ............. | H01M 10/643 |
| 2024/0347810 A1* | 10/2024 | Oh ...................... | H01M 10/617 |

* cited by examiner

*Primary Examiner* — Sarah A. Slifka

(57) ABSTRACT

The present utility model discloses a battery pack and an energy storage device. The battery pack includes at least two battery modules and at least one cooling assembly. Each battery module includes a support having a splicing portion and a plurality of battery cells mounted in the support, and two adjacent battery modules are connected to each other by two splicing portions. The at least one cooling assembly is sandwiched between the two adjacent battery modules and is in contact with the battery cells located on opposite sides of the at least one cooling assembly. According to the battery pack, the battery modules and the cooling assembly can be spliced as needed, then battery packs with different numbers of battery cells can be conveniently achieved, and the cost of the battery pack is reduced.

14 Claims, 14 Drawing Sheets

38

C

40

D

E

F

50

78

80

72

G

BATTERY PACK AND ENERGY STORAGE DEVICE

CROSS-REFERENCE TO RELATED APPLICATION

The present application claims priority to Chinese Patent Application No. CN202220024019.X, filed on Jan. 6, 2022, which is hereby incorporated by reference in its entirety.

TECHNICAL FIELD

The present utility model relates to the technical field of batteries, and in particular, to a battery pack and an energy storage device.

BACKGROUND

In order to obtain required performance parameters such as voltage, current, and capacity, a battery pack usually includes a plurality of battery cells that are electrically connected in series, parallel, or series-parallel. At the same time, in order to ensure the safety of the battery pack, the battery pack includes a cooling assembly that can cool the battery cells to ensure that the temperatures of the battery cells are within a normal range.

In the related art, for different types of battery packs, the number of the battery cells required is usually different, and the matched cooling assembly will change due to the change of the number of the battery cells. For battery pack manufacturers, different production lines or production equipment may be required to manufacture different types of battery packs, which will increase the cost of the battery packs.

SUMMARY

Embodiments of the present utility model provide a battery pack and an energy storage device.

The battery pack provided by the embodiment of the present utility model includes: at least two battery modules and at least one cooling assembly. Each battery module includes a support having a splicing portion and a plurality of battery cells mounted in the support. Two adjacent battery modules are connected to each other by the two splicing portions. The at least one cooling assembly is sandwiched between the two adjacent battery modules and is in contact with the battery cells located on opposite sides of the at least one cooling assembly.

According to the battery pack, the two battery modules are spliced together through the splicing portions of the support, and the cooling assembly is sandwiched between the two adjacent battery modules, so that the battery modules and the cooling assembly can be spliced as needed, then battery packs with different numbers of battery cells can be conveniently achieved, and the cost of the battery pack is reduced.

In some embodiments, the support includes a first support and a second support that are adjacent to each other. The splicing portion includes two first splicing sub-portions that are spaced apart from each other on the first support, and two second splicing sub-portions that are spaced apart from each other on the second support.

The first splicing sub-portions are connected to the second splicing sub-portions.

In some embodiments, the two first splicing sub-portions are located at a top and a bottom of a same side of the first support, respectively.

The two second splicing sub-portions are located at a top and a bottom of a same side of the second support, respectively.

In some embodiments, each of the two second splicing sub-portions includes a plate body arranged on an outer side surface of the second support. The plate body has a snap hole defined thereon. Each of the two first splicing sub-portions includes a snap block protruding from an outer side surface of the first support. The snap block is engaged in the snap hole.

In some embodiments, the support includes two mounting plates, and a plurality of pillars arranged at intervals and connected to the two mounting plates.

In some embodiments, the two mounting plates include a first mounting plate and a second mounting plate that are opposite to each other. Each of the plurality of pillars includes a first pillar connected to an inner surface of the first mounting plate and a second pillar connected to an inner surface of the second mounting plate. One of the first pillar and the second pillar has an insertion portion provided thereon, and the other one of the first pillar and the second pillar has a groove defined therein. The insertion portion is inserted into the groove.

In some embodiments, the groove has two side walls that are opposite to and spaced apart from each other. At least one of the side walls has an engagement hole defined thereon, and the insertion portion has a protrusion provided on at least one side surface thereof. The protrusion is engaged in the engagement hole.

In some embodiments, the groove has a bottom surface connected to the two side walls. The bottom surface has a guide hole defined thereon. The insertion portion has a guide post provided on an end thereof. The guide post is inserted into the guide hole.

In some embodiments, the two mounting plates include a first mounting plate and a second mounting plate which are opposite to each other. The first mounting plate has a plurality of first mounting portions provided on an inner surface thereof. The second mounting plate has a plurality of second mounting portions provided on an inner surface thereof. The plurality of first mounting portions corresponds to the plurality of second mounting portions respectively. The battery cell includes a body and two electrodes. The body has two ends that are accommodated within the first mounting portion and the second mounting portion, respectively. The two electrodes are arranged on two end surfaces of the body, respectively.

An energy storage device provided by the utility model includes the battery pack of any one of embodiments.

According to the energy storage device, the two battery modules are spliced together through the splicing portions of the support, and the cooling assembly is sandwiched between the two adjacent battery modules, so that the battery modules and the cooling assembly can be spliced as needed, then battery packs with different numbers of battery cells can be conveniently achieved, and the cost of the battery packs is reduced.

The additional aspects and advantages of the present utility model will be partially given in the following description, part of which will become apparent from the following description or be understood through the practice of the present utility model.

BRIEF DESCRIPTION OF DRAWINGS

The above-mentioned and/or additional aspects and advantages of the present utility model will become apparent and easy to understand from the description of the embodiments with reference to the following drawings, wherein.

DETAILED DESCRIPTION OF THE EMBODIMENTS

Figure 1:
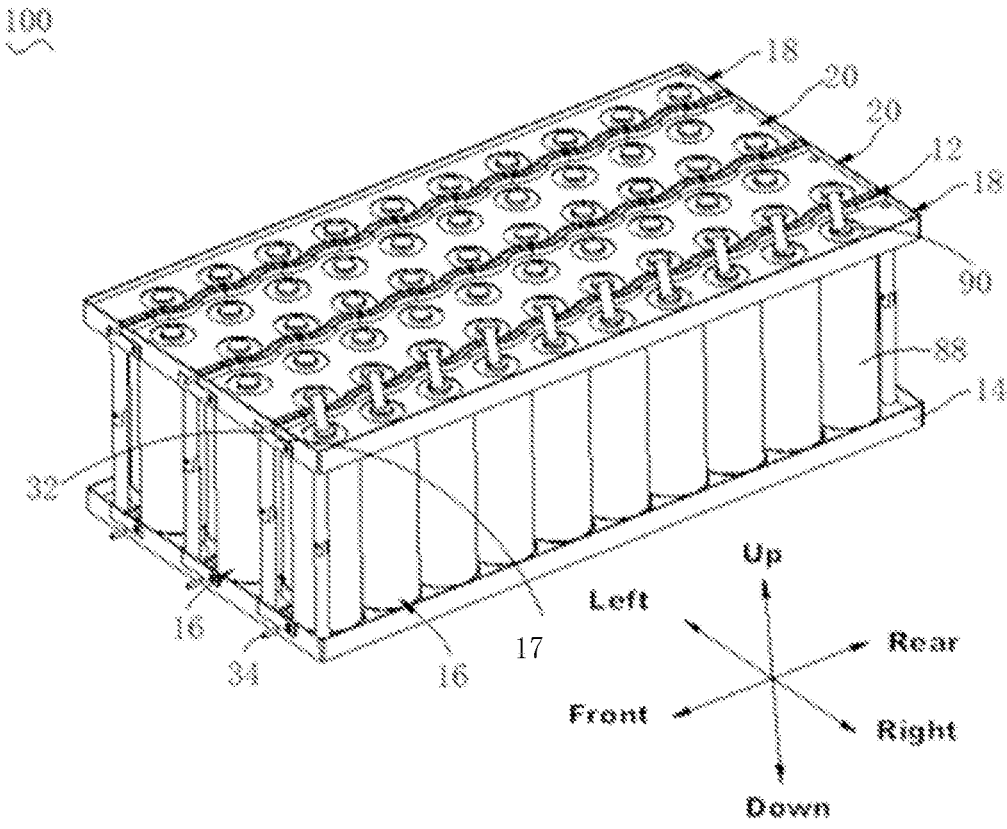
FIG. 1 is a three-dimensional schematic diagram of a battery pack according to an embodiment of the present utility model.

Embodiments of the present utility model are described in detail below, and the examples of the embodiments are shown in the drawings, where the same or similar reference numerals throughout indicate the same or similar elements or elements having the same or similar functions. The embodiments described below by reference to the drawings are exemplary, only intended to be illustrative of the present utility model and not to be construed as limiting to the present utility model.

In the embodiments of the present utility model, the expression that a first feature is "on" or "beneath" a second feature may include that the first and second features are in direct contact, and may also include that the first and second features are not in direct contact but contact through additional features therebetween. Moreover, the first feature being "on", "over" and "above" the second feature may include the first feature being directly over and diagonally above the second feature, or only represents that the level of the first feature is higher than the level of the second feature. The first feature being "beneath", "under" and "below" the second feature may include the first feature being directly under and diagonally below the second feature, or only represents that the level of the first feature is lower than the level of the second feature.

The following disclosure provides many different embodiments or examples for implementing different structures of the present utility model. In order to simplify the disclosure of the present utility model, the components and arrangements of specific examples are described below. Of course, they are merely examples and are not intended to limit the present utility model. In addition, the present utility model may repeat reference numbers and/or reference letters in various examples, which are for the purpose of simplicity and clarity, and do not indicate a relationship between various implementations and/or arrangements discussed. In addition, the present utility model provides examples of various specific processes and materials, but a person of ordinary skill in the art will recognize the application of other processes and/or the use of other materials.

Figure 2:
FIG. 2 is a three-dimensional schematic diagram of a cooling assembly according to the embodiment of the present utility model.
Figure 2:
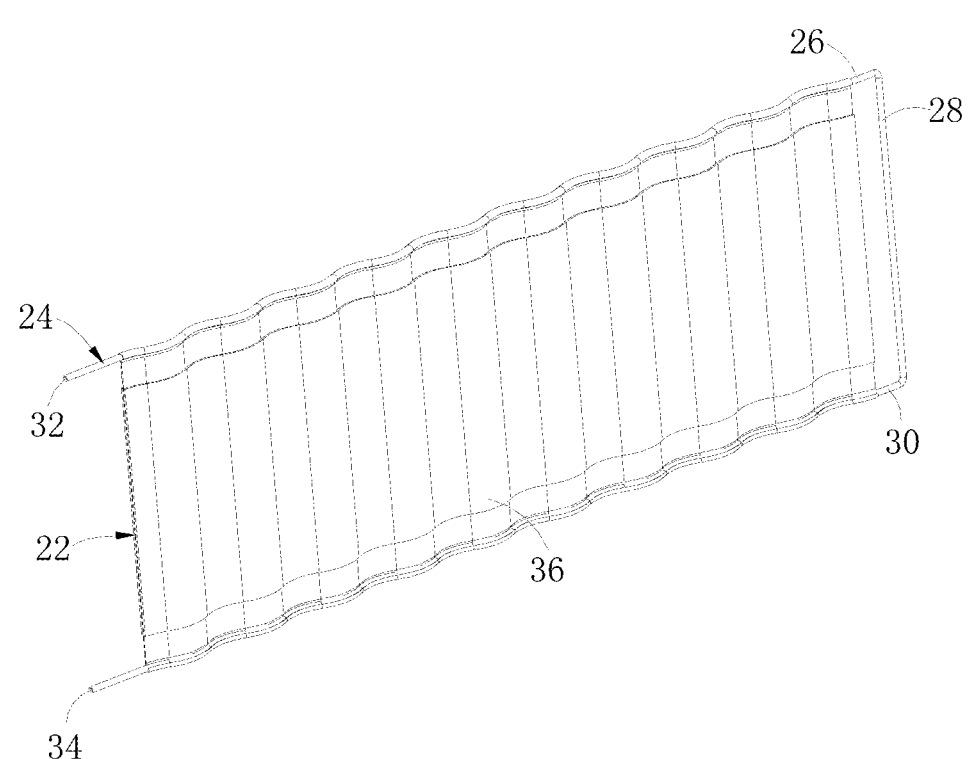

Referring to FIG. 1 to FIG. 2, an embodiment of the present utility model provides a battery pack 100, which includes at least two battery modules and at least one cooling assembly 12.

Each battery module includes a support 14 having a splicing portion 17 and a plurality of battery cells 16 mounted in the support 14, and two adjacent battery modules are connected to each other by two splicing portions 17. The at least one cooling assembly 12 is sandwiched between the two adjacent battery modules and is in contact with the battery cells 16 located on opposite sides of the at least one cooling assembly 12.

According to the battery pack 100, the two battery modules are spliced together through the splicing portions of the support 14, and the cooling assembly 12 is sandwiched between the two adjacent battery modules, so that the battery modules and the cooling assembly 12 can be spliced as needed, then battery packs 100 with different numbers of battery cells 16 can be conveniently achieved, and the cost of the battery pack 100 is reduced.

Specifically, the battery pack 100 can further include a housing. The battery modules and the cooling assembly 12 are both located in the housing. The battery module, the cooling assembly 12 and other components can be protected by the housing, and the housing can also protect a user from touching the battery module and having an accident.

The housing can be a metal housing or a plastic housing. When the housing is the metal housing, the housing has an insulating material provided on the inner wall of the housing, so that the inner wall of the housing is spaced apart from the battery modules.

The at least two battery modules can include a first battery module 18 and a second battery module 20. In the embodiment shown in the figure, the battery pack 100 includes four battery modules. In one embodiment, the first battery modules 18 can be a left-most battery module and a right-most battery module. A plurality of battery cells 16 of each first battery module 18 is arranged in one battery cell row. The second battery modules 20 can be two middle battery modules, and a plurality of battery cells 16 of each second battery module 20 is arranged in two battery cell rows. The first battery module 18 on the left and the second battery module 20 on the left are spliced together to form a first module unit, and one cooling assembly 12 is sandwiched in the first module unit. The second battery module 20 on the right and the first battery module 18 on the right are spliced together to form a second module unit, and one cooling assembly 12 is sandwiched in the second module unit. One cooling assembly 12 is also sandwiched between the first module unit and the second module unit. The cooling assembly 12 can be connected to each battery cell 16 in the battery cell row in a thermal conduction manner so as to take away heat generated when the battery cell 16 operates.

In one embodiment, the first battery module 18 can be a left-most battery module and a middle-right battery module. A plurality of battery cells 16 of the left-most first battery module 18 is arranged in one battery cell row, and a plurality of battery cells 16 of the middle-right first battery module 18 is arranged in two battery cell rows. The second battery module 20 can be a middle-left battery module and a right-most battery module. A plurality of battery cells 16 of the middle-left second battery module 20 is arranged in two battery cell rows, and a plurality of battery cells 16 of the right-most battery second module 20 is arranged in one battery cell row. The first battery module 18 on the left and the second battery module 20 on the left are spliced together to form a first module unit, and one cooling assembly 12 is sandwiched in the first module unit. The second battery module 20 on the right and the first battery module 18 on the right are spliced together to form a second module unit, and one cooling assembly 12 is sandwiched in the second module unit. One cooling assembly 12 is also sandwiched between the first module unit and the second module unit.

It can be understood that in other embodiments, the arrangement of the first battery modules 18 and the second battery modules 20 is not limited to the above-mentioned manner, and there may be other manners, and the number of rows where a plurality of battery cells 16 of each battery module is arranged is also not specifically limited. The arrangement of the cooling assemblies 12 is sufficient to enable each battery cell 16 to be connected to the cooling assembly 12 in a thermal conduction manner. In conclusion, the required battery modules can be spliced as required, which has a low cost, a simple assembling process, and a high assembling efficiency.

Figure 3:
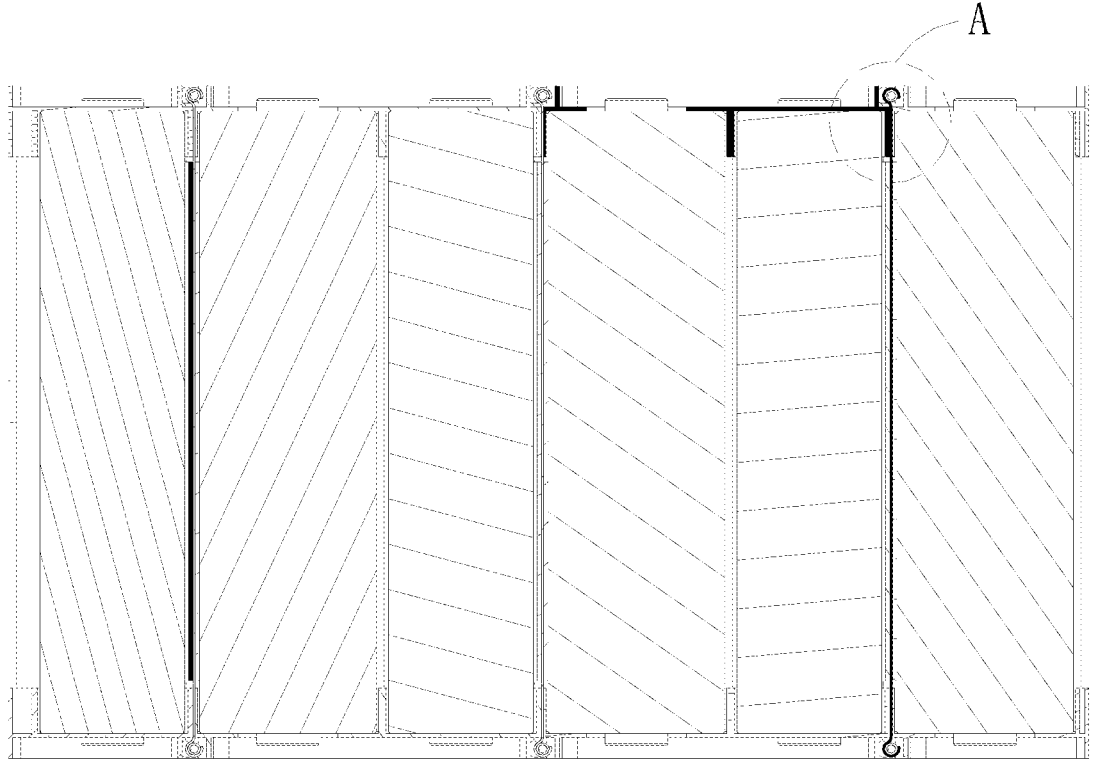
FIG. 3 is a schematic cross-sectional view of a battery pack according to an embodiment of the present utility model.
Figure 4:
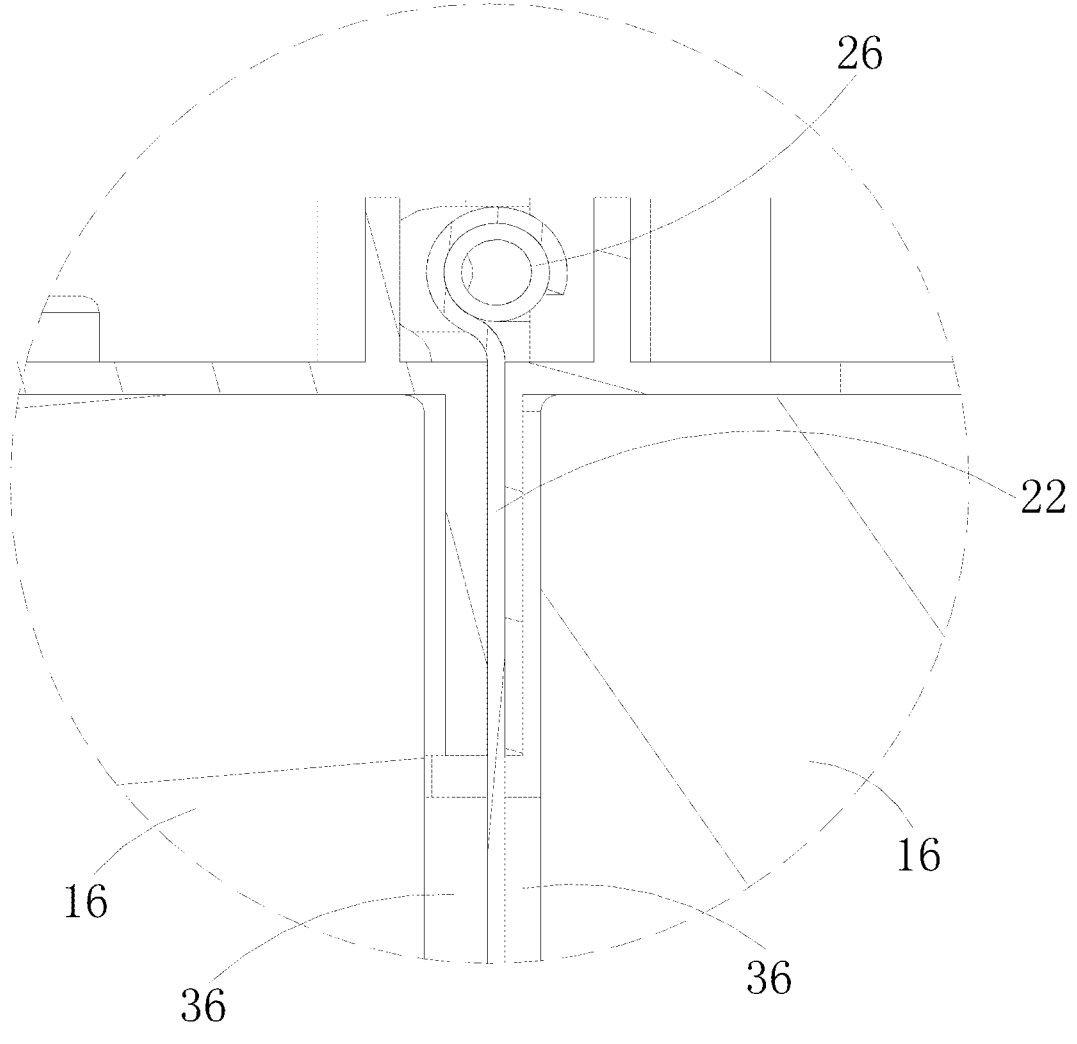
FIG. 4 is an enlarged schematic diagram of part A in FIG. 3.

In one embodiment, the cooling assembly 12 can be a liquid cooling assembly. Referring to FIG. 2 to FIG. 4, the cooling assembly 12 includes a cooling plate 22 and a liquid cooling tube 24. The liquid cooling tube 24 includes a first tube 26, a connecting tube 28 and a second tube 30. The connecting tube 28 is connected to one end of the first tube 26 and one end of the second tube 30. The first tube 26 has a liquid inlet 32 defined in the other end. The second tube 30 has a liquid outlet 34 defined in the other end. The liquid inlet 32 and the liquid outlet 34 are located on a same side of the battery pack 100.

The first tube 26 is partially wrapped by an upper end of the cooling plate 22, and the second tube 30 is partially wrapped by a lower end of the cooling plate 22. The opposite sides of the cooling plate 22 can be connected to side surfaces of the battery cells 16 through a thermal conductive pad 36 respectively in a thermal conduction manner. The heat generated by the battery cell 16 can be conducted to the cooling plate 22 through the thermal conductive pad 36, and then is conducted to the first tube 26 and the second tube 30 through the cooling plate 22. The first tube 26 and the second tube 30 absorb heat, so that the temperature of cooling liquid in the tubes increases, and the flowing cooling liquid can take away the heat.

The temperature at the liquid inlet 32 is the lowest in the process of cooling, the temperature of the cooling liquid gradually increases in the process of cooling liquid flowing in the cooling tube, and when the cooling liquid reaches the liquid outlet 34, the temperature is the highest, that is, the temperatures of the first tube 26 and the second tube 30 increases reversely, so that the temperature at each position can be kept consistent. At the same time, the temperature of a single battery cell 16 can be kept consistent. Thus, the consistency of the heat dissipation effect of the battery module is improved, and the performance consistency of each single battery cell 16 is improved, thereby leading to the good cooling and heat dissipation effect.

In the embodiment shown in the figure, the cooling plate 22 is wavy, the battery cell 16 can be partially accommodated in a wavy recess, and a part of a side surface of the battery cell 16 is wrapped by the thermal conductive pad in the recess so as to increase the contact area. The thermal conductive pad 36 can increase the fitness between the battery cell 16 and the cooling plate 22.

Figure 5:
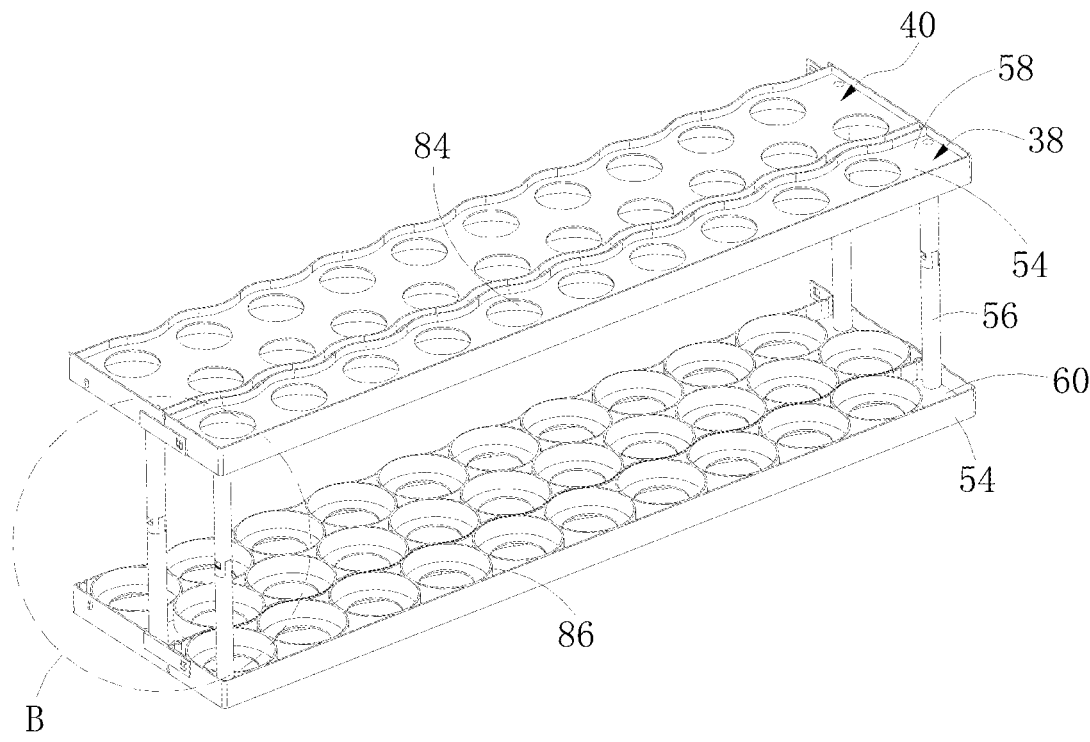
FIG. 5 is a schematic diagram of connection of a first support and a second support according to an embodiment of the present utility model.
Figure 6:
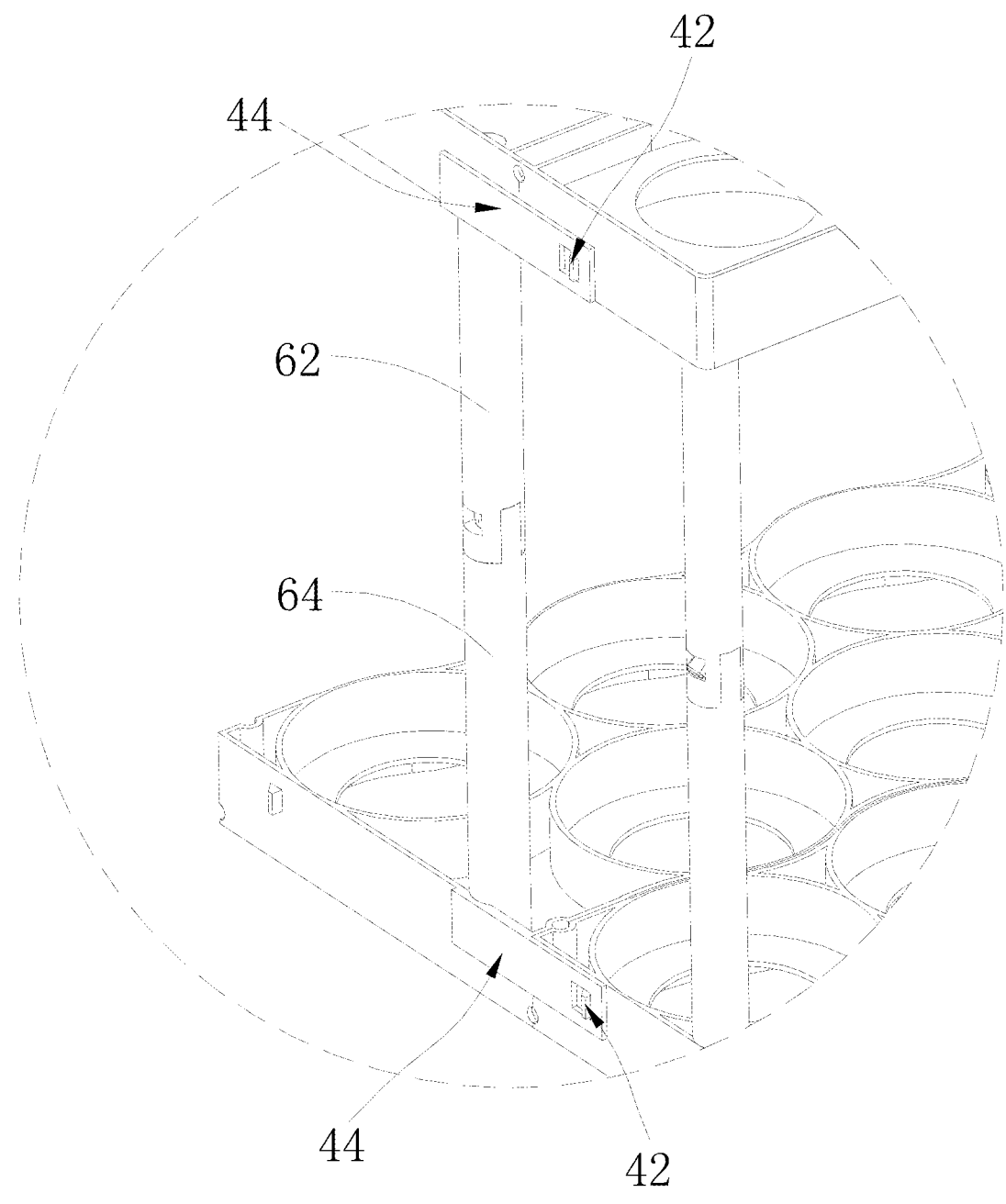
FIG. 6 is an enlarged schematic diagram of part B in FIG. 5.
Figure 7:
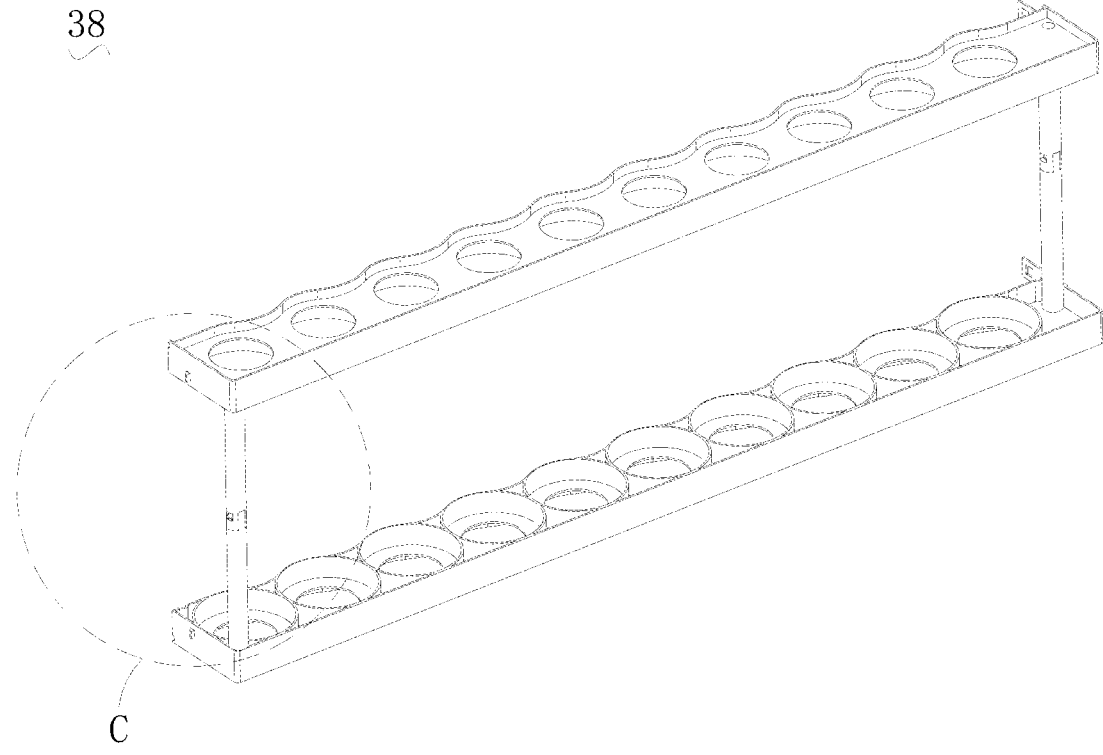
FIG. 7 is a three-dimensional schematic diagram of a first support according to an embodiment of the present utility model.
Figure 8:
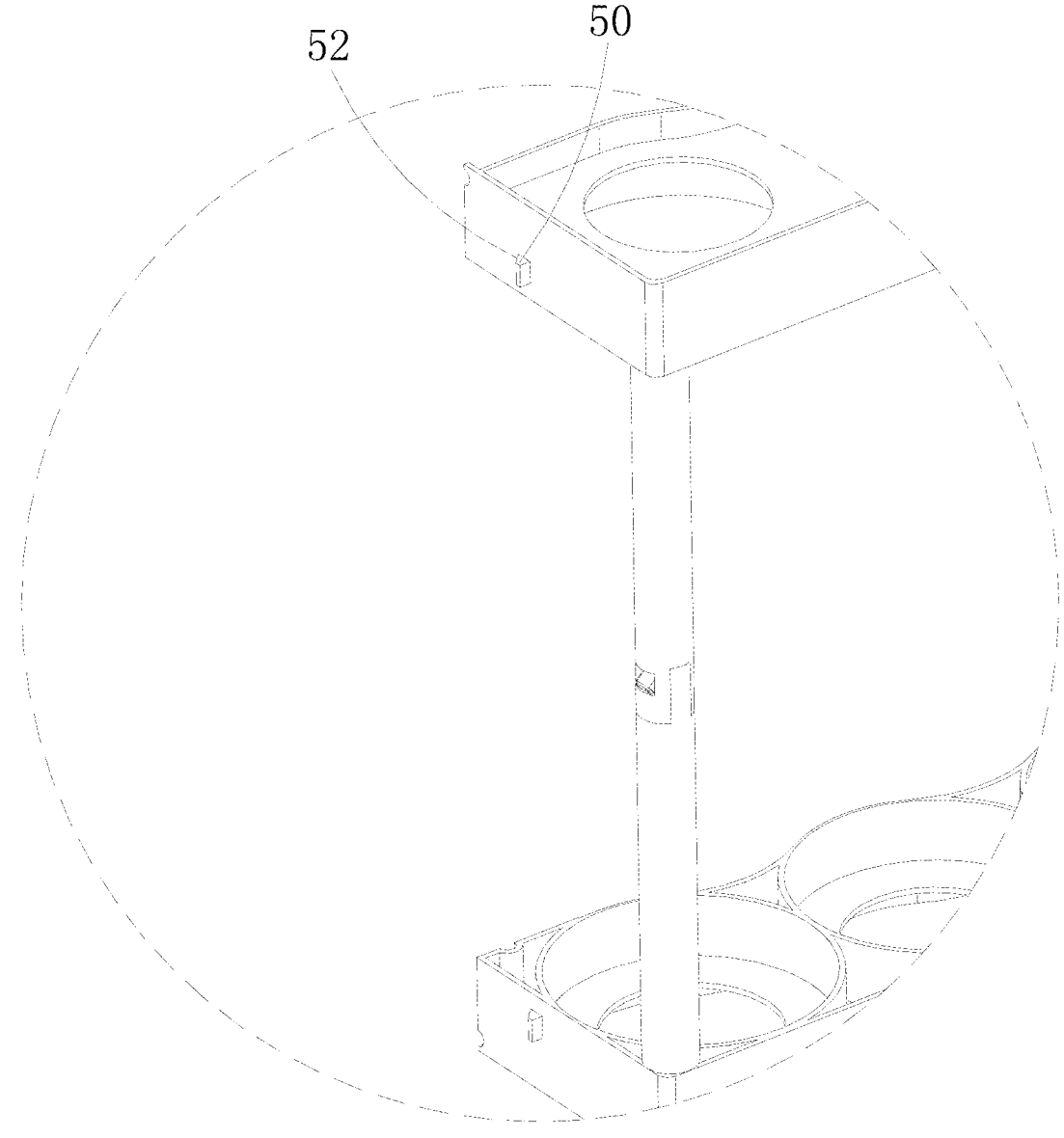
FIG. 8 is an enlarged schematic diagram of part C in FIG. 7.
Figure 9:
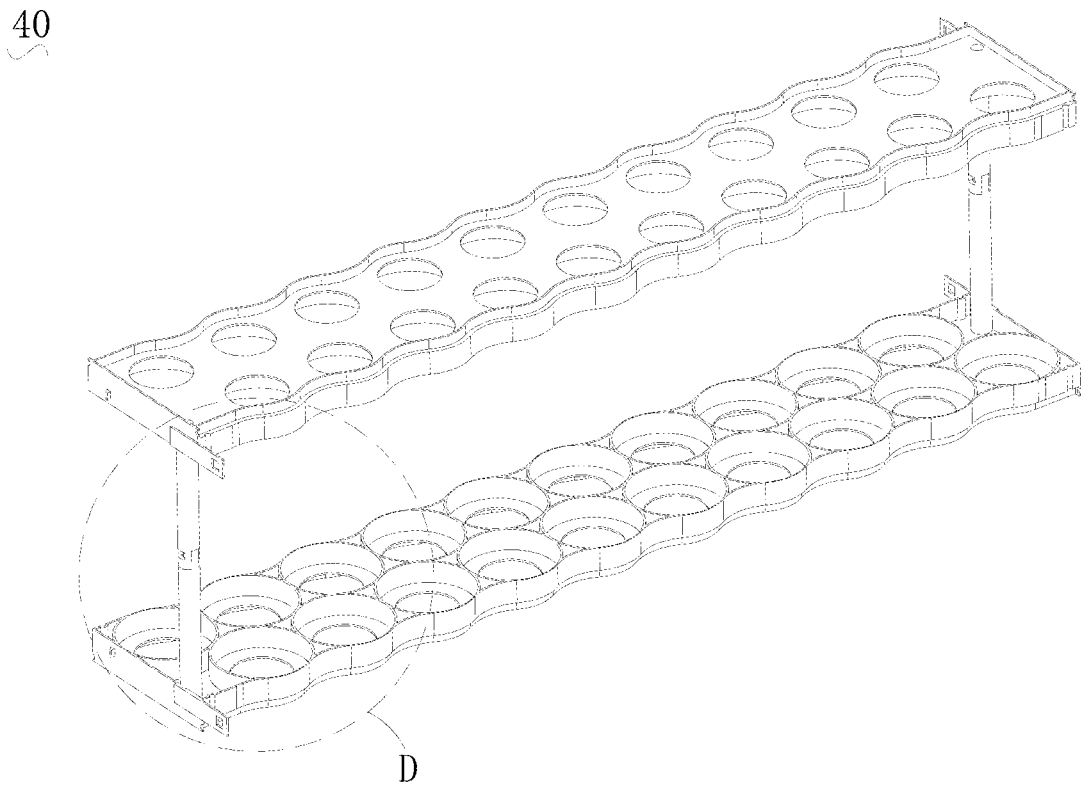
FIG. 9 is a three-dimensional schematic diagram of a second support according to an embodiment of the present utility model.
Figure 10:
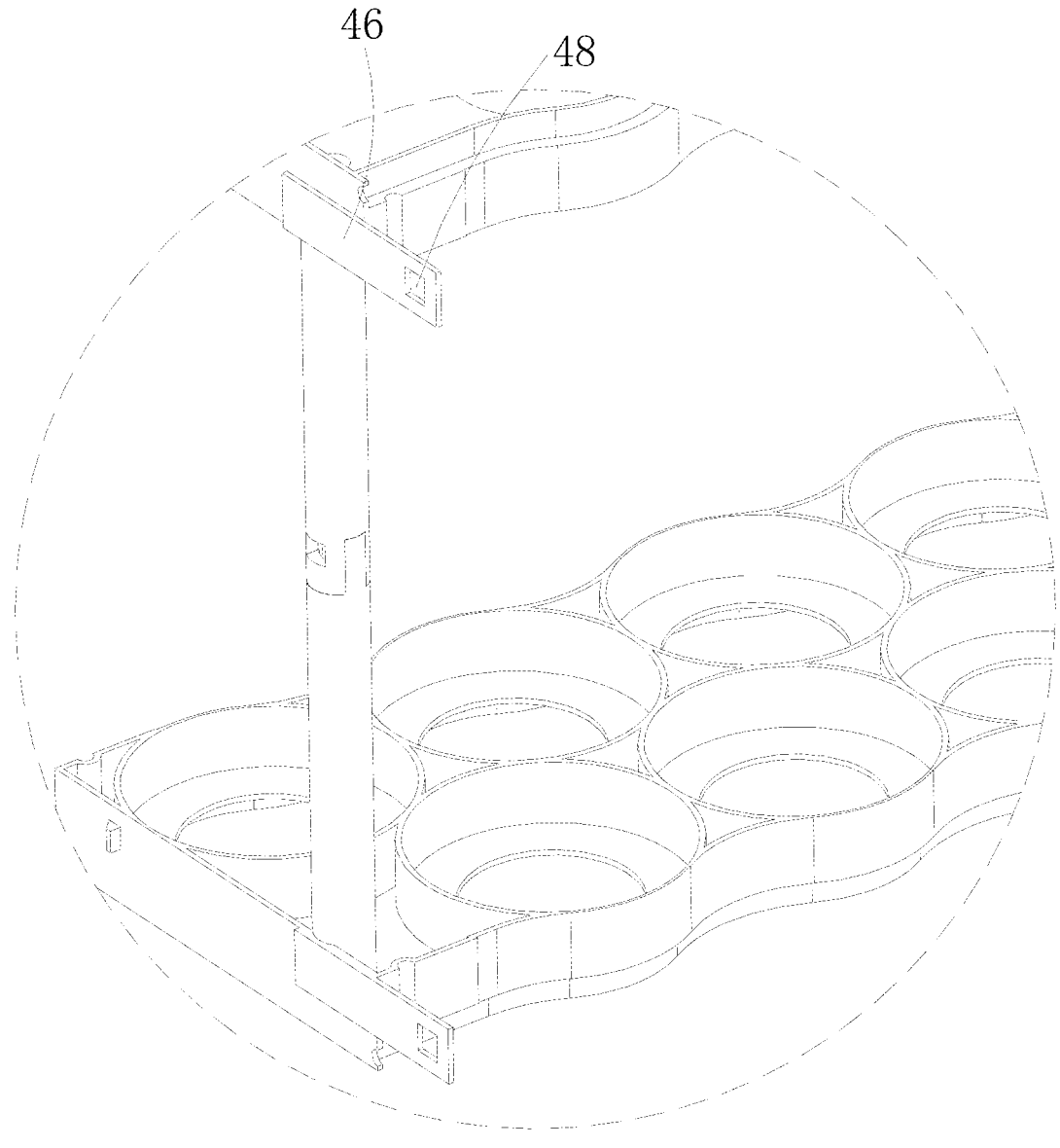
FIG. 10 is an enlarged schematic view of part D in FIG. 9.
Figure 11:
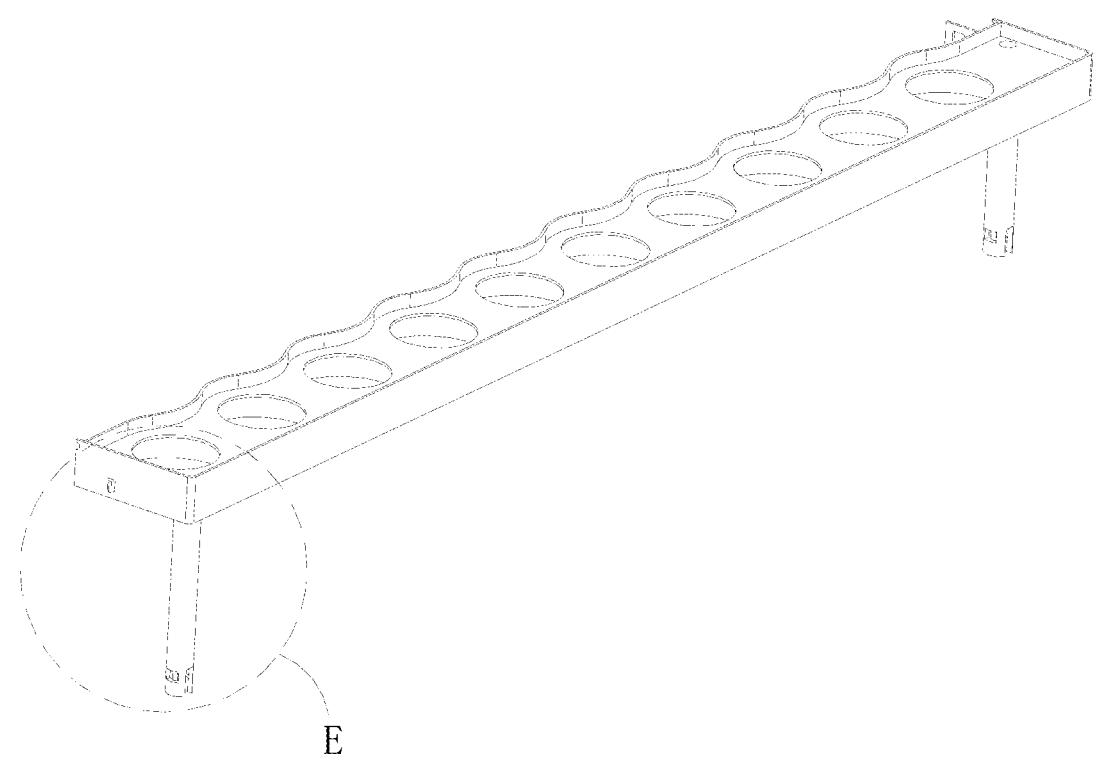
FIG. 11 is a schematic diagram of a part of a first support according to an embodiment of the present utility model.
Figure 12:
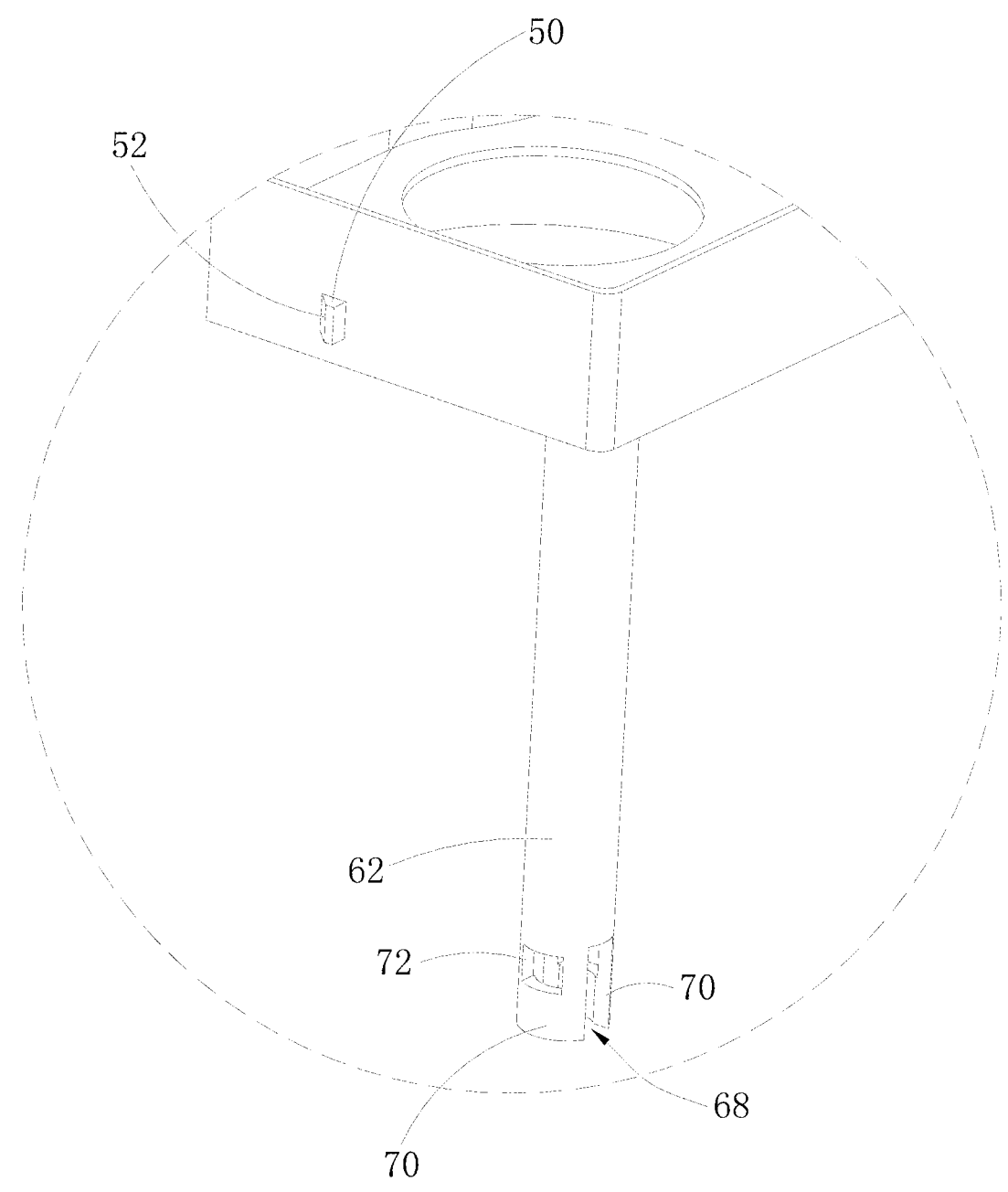
FIG. 12 is an enlarged schematic view of part E in FIG. 11.
Figures 13, 14:
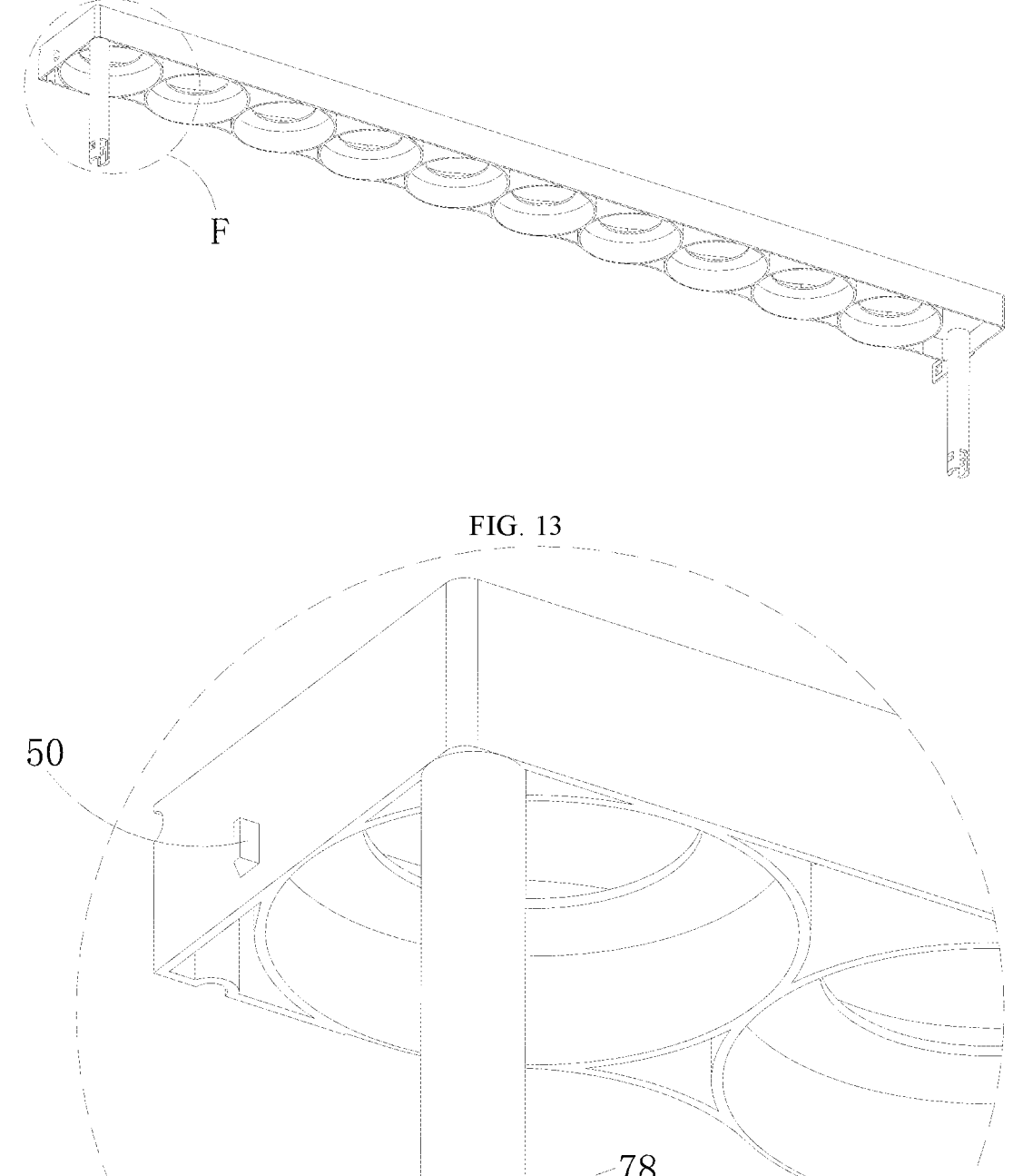
FIG. 13 is a schematic diagram of another part of a first support according to an embodiment of the present utility model.
FIG. 14 is an enlarged schematic diagram of part F in FIG. 13.
Figure 15:
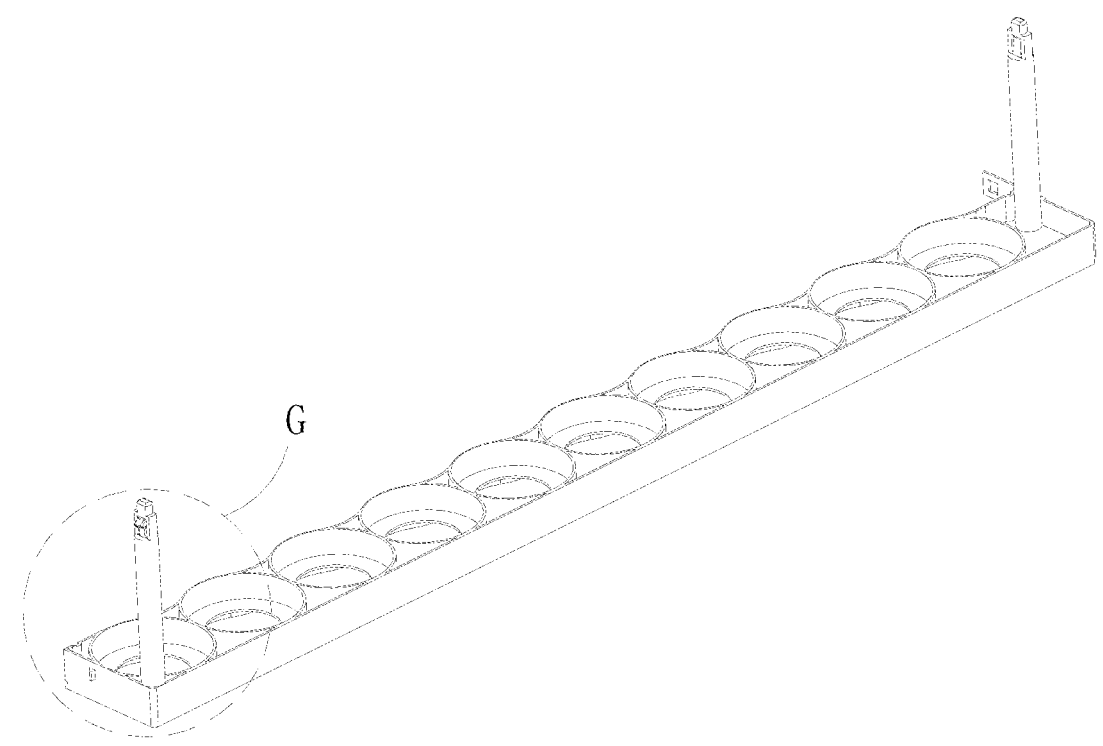
FIG. 15 is a schematic diagram of another part of a first support according to an embodiment of the present utility model.
Figure 16:
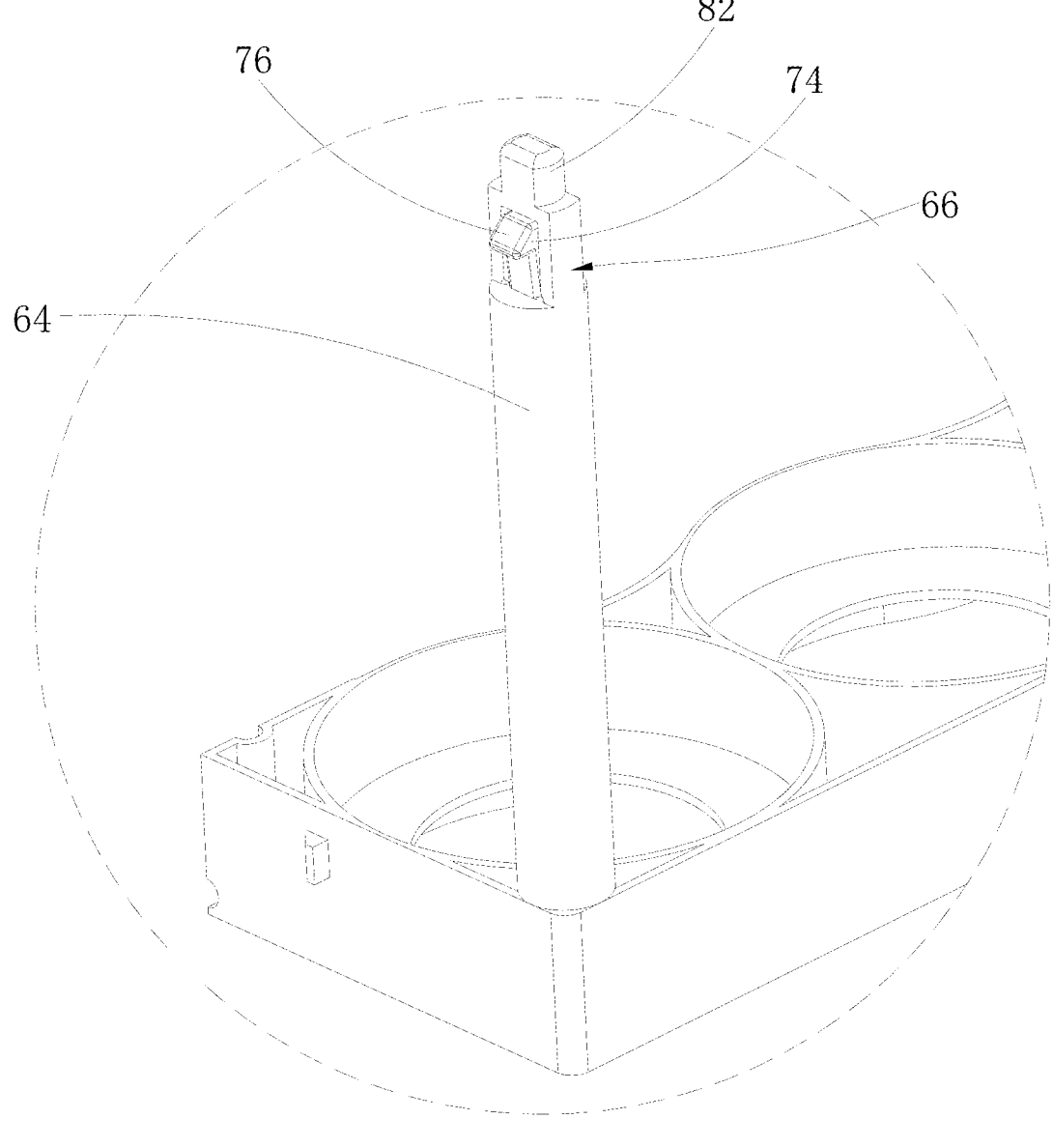
FIG. 16 is an enlarged schematic diagram of part G in FIG. 15.

In certain embodiments, referring to FIG. 5 and FIG. 6, the support 14 includes a first support 38 and a second support 40 which are adjacent to each other, and the splicing portion 17 includes the two first splicing sub-portions 42 that are spaced apart from each other on the first support 38, and the two second splicing sub-portions 44 that are spaced apart from each other on the second support 40. The first splicing sub-portion 42 is connected to the second splicing sub-portion 44. Thus, the connection strength of the two battery modules can be improved by using the two splicing portions 17 to splice the two battery modules.

Specifically, the connection strength of the two battery modules can be improved by splicing the first battery module 18 and the second battery module 20 at two different positions.

In addition, the first splicing sub-portion 42 and the second splicing sub-portion 44 can be detachably connected, so that the detachable connection of the two adjacent battery modules can be achieved. Thus, maintenance can be facilitated, and the cooling assembly 12 can also be used repeatedly.

In some embodiments, the two first splicing sub-portions 42 are located at a top and a bottom of a same side of the first support 38, respectively; and the two second splicing sub-portions 44 are located at a top and a bottom of a same side of the second support 40, respectively. Thus, the connection strength of the two battery modules can be further improved.

Specifically, the first support 38 includes a front side and a rear side. The front side and the rear side are each provided with the two first splicing sub-portions 42, and the two first splicing sub-portions 42 located on the same side are distributed on the top and the bottom.

The second support 40 includes a front side and a rear side. The front side and the rear side are each provided with the two second splicing sub-portions 44, and the two second splicing sub-portions 44 located on the same side are distributed on the top and the bottom. The first splicing sub-portions 42 and the second splicing sub-portions that are located on the same side are in positional correspondence. When splicing is performed, one support 14 and a plurality of battery cells 16 are assembled into one battery module, the other one support 14 and a plurality of battery cells 16 are assembled into another battery module, the two battery modules are spliced together by using the first splicing sub-portions 42 and the second splicing sub-portions 44, and the cooling assembly 12 is sandwiched between the two battery modules. As the first splicing sub-portions 42 and the second splicing sub-portions 44 are located on the bottom and top of the same side, the tops and bottoms of the front and rear sides of the two adjacent battery modules are connected and fixed, and thus, the shaking of the battery modules is avoided.

In some embodiments, referring to FIG. 7 to FIG. 10, the second splicing sub-portion 44 includes a plate body 46 arranged on an outer side surface of the second support 40, the plate body 46 has a snap hole 48 defined thereon. The first splicing sub-portion 42 includes a snap block 50, which protrudes from an outer side surface of the first support 38 and is engaged in the snap hole 48. Thus, the splicing of the two battery modules can be facilitated.

Specifically, the plate body 46 is in the shape of a flat rectangular parallelepiped, and the snap hole 48 can be formed at a part, close to another battery module, of the plate body 46. In the embodiment shown in the figure, the snap hole 48 is square. It can be understood that in other embodiments, the plate body 46 and the snap hole 48 may also be of other shapes, which are not specifically limited here.

The snap block 50 has a guiding inclined surface 52 facing the plate body 46. When the two adjacent battery modules are spliced, the plate body 46 and the snap block 50 move toward each other, an end of the plate body 46 is abutted against the guiding inclined surface 52, the plate body 46 and the snap block 50 continue to move toward each other, and the guiding inclined surface 52 guides the plate body 46 toward a top of the snap block 50, so that an inner surface of the plate body 46 is abutted against the top of the snap block 50. With the continuous movement of the plate body 46 and the snap block 50, the snap block 50 penetrates out of the plate body 46 through the snap hole 48, and is engaged in the snap hole 48 to achieve the splicing of the two battery modules.

It can be understood that the structures of the splicing portions on the front and rear sides of the support may be the same or different, which is not specifically limited here. For example, each of the splicing portions at the top and bottom of the front side of the support may include the snap block, and each of the splicing portions at the top and bottom of the rear side of the same support may include the plate body, the snap hole formed in the plate body and the like.

In some embodiments, the support 14 includes two mounting plates 54 and a plurality of pillars 56 arranged at intervals and connected to the two mounting plates 54. Thus, the structure strength of the support 14 can be ensured.

Specifically, the battery cells 16 may be located in a space formed by the mounting plates 54 and the pillars 56. The two mounting plates 54 are connected by using the pillars 56. On the one hand, the support 14 is not easily deformed, which can ensure the structure strength of the support 14, on the other hand, the pressure of the mounting plates 54 on the battery cells 16 can also be reduced, which can ensure the reliability of the battery cells 16, and improve the safety performance of the battery pack 100.

In certain embodiments, the two mounting plates 54 include a first mounting plate 58 and a second mounting plate 60 which are opposite to each other. The pillar includes a first pillar 62 connected to an inner surface of the first mounting plate 58 and a second pillar 64 connected to an inner surface of the second mounting plate 60. One of the first pillar 62 and the second pillar 64 has an insertion portion 66 provided thereon, the other one of the first pillar 62 and the second pillar 64 has a groove 68 defined therein, and the insertion portion 66 is inserted into the groove 68. Thus, the connection of the first pillar 62 and the second pillar 64 is facilitated.

Specially, in one embodiment, the first pillar 62 has the groove 68 defined therein, and the second pillar 64 has the insertion portion 66 provided thereon. The first mounting plate 58 can be the upper mounting plate, and the second mounting plate 60 can be the lower mounting plate. Firstly, the battery cells 16 can be arranged on the second mounting plate 60, then the second mounting plate 60 with the battery cells 16 is covered by the first mounting plate 58, the insertion portions 66 of the second pillars 64 are inserted into the grooves 68 and are engaged in the grooves 68, thus, the connection and fixation of the first pillars 62 and the second pillars 64 is achieved, and the loosening of the support 14 is avoided.

In some embodiments, referring to FIG. 11 to FIG. 16, the groove 68 has two side walls 70 that are opposite to and spaced apart from each other. At least one of the side walls 70 has an engagement hole 72 defined thereon. The insertion portion 66 has a protrusion 74 provided on at least one side surface 70 thereof, and the protrusion 74 is engaged in the engagement hole 72. Thus, the connection of the groove 68 and the insertion portion 66 can be achieved.

Specifically, in the embodiment shown in the figure, each of the two side walls 70 of the groove 68 has the engagement hole 72 defined thereon, which can meet more installation requirements and is applied in more directions.

The insertion portion 66 has the protrusion 74 provided on one side surface 70 thereof, the protrusion 74 has a guiding inclined surface 76 provided on an outer side surface thereof, and the guiding inclined surface 76 is inclined from a bottom of the protrusion 74 to the top. When the first mounting plate 58 and the second mounting plate 60 are assembled, a bottom of the side wall 70 of the groove 68 is abutted against the guiding inclined surface 76 of the protrusion 74, so that the protrusion 74 retracts. With the movement of the groove 68 and the protrusion 74 toward each other, the protrusion 74 is engaged in the groove 68, the side wall 70 of the groove 68 continuously extrudes the protrusion 74. When the protrusion 74 meets the engagement hole 72, the protrusion 74 protrudes and is engaged in the engagement hole 72 so as to achieve the connection of the groove 68 and the insertion portion 66, and thus, the connection and fixation of the first pillar 62 and the second pillar 64 is achieved.

It can be understood that in other embodiments, the groove 68 can have an engagement hole 72 defined on one side wall 70 thereof.

In some embodiments, the groove 68 includes a bottom surface 78 connected to the two side walls 70. The bottom surface 78 has a guide hole 80 defined thereon. The insertion portion 66 has a guide post 82 provided on an end thereof. The guide post 82 is inserted into the guide hole 80. Thus, the insertion portion 66 can be guided into the groove 68.

Specifically, when the insertion portion 66 is inserted into the groove 68, the guide post 82 firstly enters the groove 68 to guide the insertion portion 66 to a certain extent. With the movement of the first pillar 62 and the second pillar 64 toward each other, the insertion portion 66 enters the groove 68, the guide post 82 is inserted into the guide hole 80, and the protrusion 74 is extruded by the side wall 70 of the groove 68 and retracts. Through the cooperation of the guide post 82 and the guide hole 80, the protrusion 74 can also be guided to move to a direction where the engagement hole 72 is located, and is prevented from being unable to enter the engagement hole 72.

In some embodiments, the two mounting plates 54 include the first mounting plate 58 and the second mounting plate 60 which are opposite to each other. The first mounting plate 58 has a plurality of first mounting portions 84 provided on an inner surface thereof. The second mounting plate 60 has a plurality of second mounting portions 86 provided on an inner surface thereof. The plurality of first mounting portions 84 corresponds to the plurality of second mounting portions 86 respectively. The battery cell 16 includes a body 88 and two electrodes 90. The body 88 has two ends that are accommodated within the first mounting portion 84 and the second mounting portion 86, respectively. The two electrodes 90 are arranged on two end surfaces of the body 88, respectively. Thus, the positioning and installation of the battery cells 16 can be facilitated.

Specifically, the number of the first mounting portions 84 corresponds to the number of the second mounting portions 86, and one battery cell 16 can be arranged on the two mounting portions.

In the embodiment shown in the figure, the battery cell 16 is cylindrical, and an accommodating slot formed in the mounting portions is a correspondingly cylindrical. The mounting portions can be arranged in rows. Preferably, a mounting portion in one of two adjacent rows of mounting portions is partially located in a space between two adjacent mounting portions in the other row of mounting portions, so that the battery pack 100 can be made more compact.

In one embodiment, the first mounting plate 58 can be the upper mounting plate, and the second mounting plate 60 can be the lower mounting plate. When the battery cells 16 are installed, bottoms of the bodies 88 are placed in the second mounting portions 86 of the second mounting plate 60; and after the battery cells 16 are placed in the second mounting plate 60, the battery cells 16 are covered by the first mounting plate 58, the first pillars 62 and the second pillars 64 are connected and fixed, and tops of the bodies 88 are accommodated in the first mounting portions 84. The two electrodes 90 are exposed by through holes formed in bottom surfaces of the accommodating slots, respectively.

In conclusion, the battery pack 100 provided by an embodiment of the present utility model can achieve the following effects:

(1) the heat dissipation effect is good;

(2) the cost is low, the assembling process is simple, and the assembling efficiency is high;

(3) the system is small in size and light in weight, the module grouping efficiency is relatively high, and the volume energy density and the mass energy density are relatively high;

(4) the safe reliability is high;

(5) the heat dissipation effect of each battery cell 16 is consistent, the temperature consistency of the battery cells 16 in the battery module is high, and the cycle life of the module is relatively long; and (6) the module is detachable and is convenient to maintain, and the cooling assembly 12 can be used repeatedly.

An embodiment of the present utility model provides an energy storage device, which includes the battery pack 100 of any one of the above-mentioned embodiments.

According to the energy storage device, the two battery modules are spliced together through the splicing portions of the support 14, and the cooling assembly 12 is sandwiched between the two battery modules, so that the battery modules and the cooling assembly 12 can be spliced as needed, then the battery packs 100 with different numbers of battery cells 16 can be conveniently achieved, and the cost of the battery pack is reduced.

Specifically, the energy storage device can be made in the form of a household energy storage cabinet or a small container, and the energy storage device can be placed in a designated position indoors or outdoors. When the energy storage device is placed outdoors, it is necessary to pay attention to the waterproof and dustproof grades of the energy storage device.

The energy storage device may further include a cluster rack on which a plurality of battery packs 100 is mounted, and the plurality of battery packs 100 may be electrically connected in series, parallel or series-parallel. A plurality of battery packs 100 may be mounted on the cluster rack in rows and columns.

In the description of this specification, the description with reference to the terms "one implementation manner", "some implementation manners", "exemplary implementation manners", "examples", "specific examples", or "some examples", etc. means that the specific features, structures, materials or characteristics described with reference to the implementation manners or examples are involved in at least one implementation manner or example of the present utility model. In this specification, schematic representations of the above terms do not necessarily refer to the same embodiment or example. Furthermore, the particular features, structures, materials or characteristics described may be combined in any suitable manner in any one or more embodiments or examples.

While embodiments of the present utility model have been described herein, it is understood that the embodiments are exemplary and should not be understood as limitations to the present utility model, and changes, modifications, alternatives and variations can be made by those skilled in the art within the scope of this disclosure.

What is claimed is:

1. A battery pack, comprising:
at least two battery modules, wherein each of the at least two battery modules comprises a support having a splicing portion and a plurality of battery cells mounted in the support, and wherein two adjacent battery modules are connected to each other by two splicing portions; and
at least one cooling assembly sandwiched between the two adjacent battery modules and in contact with battery cells located on opposite sides of the at least one cooling assembly,
wherein the support comprises a first support and a second support that are adjacent to each other,
wherein the first support includes a front side and a rear side, the front side and the rear side of the first support being each provided with two first splicing sub-portions, wherein the two first splicing sub-portions are located at a top and a bottom of a same side of the first support, respectively:
wherein the second support includes a front side and a rear side, the front side and the rear side of the second support being each provided with two second splicing sub-portions, wherein the two second splicing sub-portions are located at a top and a bottom of a same side of the second support, respectively, and
wherein each of the two first splicing sub-portions is connected to a corresponding one of the two second splicing sub-portions.

2. The battery pack according to claim 1, wherein each of the two second splicing sub-portions comprises a plate body arranged on an outer side surface of the second support, the plate body having a snap hole defined thereon, and wherein each of the two first splicing sub-portions comprises a snap block protruding from an outer side surface of the first support and engaged in the snap hole.

3. The battery pack according to claim 1, wherein the support comprises:
two mounting plates; and
a plurality of pillars arranged at intervals and connected to the two mounting plates.

4. The battery pack according to claim 3, wherein the two mounting plates comprise a first mounting plate and a second mounting plate which are opposite to each other, wherein the plurality of pillars comprises a first pillar connected to an inner surface of the first mounting plate and a second pillar connected to an inner surface of the second mounting plate, and wherein one of the first pillar and the second pillar has an insertion portion provided thereon, and the other one of the first pillar and the second pillar has a groove defined therein, the insertion portion being inserted into the groove.

5. The battery pack according to claim 4, wherein the groove has two side walls that are opposite to and spaced apart from each other, at least one of the side walls having an engagement hole defined thereon, and wherein the insertion portion has a protrusion provided on at least one side surface thereof, the protrusion being engaged in the engagement hole.

6. The battery pack according to claim 5, wherein the groove has a bottom surface connected to the two side walls, the bottom surface having a guide hole defined thereon, and wherein the insertion portion has a guide post provided on an end thereof and inserted into the guide hole.

7. The battery pack according to claim 3, wherein the two mounting plates comprise a first mounting plate and a second mounting plate which are opposite to each other, the first mounting plate having a plurality of first mounting portions provided on an inner surface thereof, the second mounting plate having a plurality of second mounting portions provided on an inner surface thereof, wherein the plurality of first mounting portions corresponds to the plurality of second mounting portions respectively; and wherein the battery cell comprises:

a body having two ends that are accommodated within the first mounting portion and the second mounting portion, respectively; and two electrodes that are arranged on two end surfaces of the body, respectively.

8. An energy storage device, comprising a battery pack, the battery pack comprising:

at least two battery modules, wherein each of the at least two battery modules comprises a support having a splicing portion and a plurality of battery cells mounted in the support, and wherein two adjacent battery modules are connected to each other by two splicing portions; and at least one cooling assembly sandwiched between the two adjacent battery modules and in contact with battery cells located on opposite sides of the at least one cooling assembly, wherein the support comprises a first support and a second support that are adjacent to each other, wherein the first support includes a front side and a rear side, the front side and the rear side of the first support being each provided with two first splicing sub-portions, wherein the two first splicing sub-portions are located at a top and a bottom of a same side of the first support, respectively;

wherein the second support includes a front side and a rear side, the front side and the rear side of the second support being each provided with two second splicing sub-portions, wherein the two second splicing sub-portions are located at a top and a bottom of a same side of the second support, respectively, and wherein each of the two first splicing sub-portions is connected to a corresponding one of the two second splicing sub-portions.

9. The energy storage device according to claim 8, wherein each of the two second splicing sub-portions comprises a plate body arranged on an outer side surface of the second support, the plate body having a snap hole defined thereon, and wherein each of the two first splicing sub-portions comprises a snap block protruding from an outer side surface of the first support and engaged in the snap hole.

10. The energy storage device according to claim 8, wherein the support comprises:

two mounting plates; and a plurality of pillars arranged at intervals and connected to the two mounting plates.

11. The energy storage device according to claim 10, wherein the two mounting plates comprise a first mounting plate and a second mounting plate which are opposite to each other, wherein the plurality of pillars comprises a first pillar connected to an inner surface of the first mounting plate and a second pillar connected to an inner surface of the second mounting plate, and wherein one of the first pillar and the second pillar has an insertion portion provided thereon, and the other one of the first pillar and the second pillar has a groove defined therein, the insertion portion being inserted into the groove.

12. The energy storage device according to claim 11, wherein the groove has two side walls that are opposite to and spaced apart from each other, at least one of the side walls having an engagement hole defined thereon, and wherein the insertion portion has a protrusion provided on at least one side surface thereof, the protrusion being engaged in the engagement hole.

13. The energy storage device according to claim 12, wherein the groove has a bottom surface connected to the two side walls, the bottom surface having a guide hole defined thereon, and wherein the insertion portion has a guide post provided on an end thereof and inserted into the guide hole.

14. The energy storage device according to claim 10, wherein the two mounting plates comprise a first mounting plate and a second mounting plate which are opposite to each other, the first mounting plate having a plurality of first mounting portions provided on an inner surface thereof, the second mounting plate having a plurality of second mounting portions provided on an inner surface thereof, wherein the plurality of first mounting portions corresponds to the plurality of second mounting portions respectively; and wherein the battery cell comprises:

a body having two ends that are accommodated within the first mounting portion and the second mounting portion, respectively; and two electrodes that are arranged on two end surfaces of the body, respectively.

* * * * *